US010471933B2

(12) United States Patent
Etonye (10) Patent No.: US 10,471,933 B2
(45) Date of Patent: Nov. 12, 2019

(54) VEHICLE SECURITY SYSTEM

(71) Applicant: Nzube John Etonye, West Covina, CA (US)

(72) Inventor: Nzube John Etonye, West Covina, CA (US)

( * ) Notice: Subject to any disclaimer, the term of this patent is extended or adjusted under 35 U.S.C. 154(b) by 0 days.

(21) Appl. No.: 15/682,373

(22) Filed: Aug. 21, 2017

(65) Prior Publication Data

US 2018/0244240 A1 Aug. 30, 2018

Related U.S. Application Data

(63) Continuation-in-part of application No. 15/252,149, filed on Aug. 30, 2016, now Pat. No. 10,017,156.

(51) Int. Cl.

| | |
|---|---|
| B60R 25/10 | (2013.01) |
| B60R 25/30 | (2013.01) |
| H04N 7/18 | (2006.01) |
| B60R 25/31 | (2013.01) |
| B60R 25/04 | (2013.01) |
| B60R 25/23 | (2013.01) |
| B60R 25/102 | (2013.01) |
| B60R 1/02 | (2006.01) |
| B60R 1/12 | (2006.01) |
| B60R 25/104 | (2013.01) |

(52) U.S. Cl.
CPC .............. *B60R 25/305* (2013.01); *B60R 1/02* (2013.01); *B60R 1/12* (2013.01); *B60R 25/04* (2013.01); *B60R 25/102* (2013.01); *B60R 25/104* (2013.01); *B60R 25/23* (2013.01); *B60R 25/31* (2013.01); *H04N 7/181* (2013.01); *H04N 7/188* (2013.01); *B60R 2001/1253* (2013.01); *B60R 2001/1276* (2013.01); *B60R 2001/1284* (2013.01); *B60R 2325/205* (2013.01)

(58) Field of Classification Search
None
See application file for complete search history.

(56) References Cited

U.S. PATENT DOCUMENTS

| | | | |
|---|---|---|---|
| 6,028,537 A * | 2/2000 | Suman | B60K 35/00 340/426.14 |
| 9,031,624 B2 * | 5/2015 | Ignomirello | G02B 27/0101 455/575.9 |
| 9,319,639 B1 | 4/2016 | Englander et al. | |

(Continued)

*Primary Examiner* — Julie B Lieu
(74) *Attorney, Agent, or Firm* — Plager Schack LLP; Mark H. Plager; Michael J. O'Brien (57) ABSTRACT

This invention relates to security systems. Previously, vehicle vandals and thieves were difficult to stop. Embodiments of the present invention use a vehicle security system (100) includes at least two image capture devices (ICD), sensors, a global positioning system tracking module (GPSTM), a control module (CM), and a monitoring device. The ICD are positioned at predetermined locations of the vehicle for capturing and transmitting images of a target object. The CM receives the captured images and sensor data variables. The CM analyzes the received images and sensor data variables based on predefined criteria to trigger auxiliary units. The CM transmits the images and sensor data variables based on the predefined criteria to the monitoring device. A graphical user interface displays the images for monitoring the vehicle and notifies the user.

34 Claims, 8 Drawing Sheets

(56) References Cited

U.S. PATENT DOCUMENTS

| | | | |
|---|---|---|---|
| 2003/0206102 A1 | 11/2003 | Joao | |
| 2006/0132939 A1* | 6/2006 | Blank | B60R 1/12 |
| | | | 359/838 |
| 2006/0171704 A1* | 8/2006 | Bingle | B60R 11/04 |
| | | | 396/419 |
| 2006/0287821 A1 | 12/2006 | Lin | |
| 2007/0142026 A1* | 6/2007 | Kuz | B60R 25/102 |
| | | | 455/404.1 |
| 2009/0079829 A1 | 3/2009 | Hu | |
| 2009/0109008 A1* | 4/2009 | Kuo | B60R 25/102 |
| | | | 340/426.18 |
| 2009/0121850 A1* | 5/2009 | Tanaka | B60R 25/102 |
| | | | 340/426.24 |
| 2010/0164699 A1* | 7/2010 | Mohapatra | B60R 25/102 |
| | | | 340/426.13 |
| 2011/0080481 A1 | 4/2011 | Bellingham | |
| 2014/0139331 A1* | 5/2014 | Oliver | B60R 25/04 |
| | | | 340/426.19 |
| 2015/0085121 A1* | 3/2015 | Englander | H04N 7/183 |
| | | | 348/148 |
| 2016/0082926 A1* | 3/2016 | Mouser | B60R 25/252 |
| | | | 701/2 |
| 2017/0008490 A1* | 1/2017 | Sako | G07C 9/00571 |
| 2017/0036644 A1* | 2/2017 | Howroyd | B60R 25/04 |
| 2018/0020139 A1* | 1/2018 | Tang | B60Q 1/0023 |
| 2018/0072263 A1* | 3/2018 | Green | B60R 25/24 |

\* cited by examiner

VEHICLE SECURITY SYSTEM

RELATED APPLICATION

This application is a continuation-in-part of non-provisional patent application U.S. Ser. No. 15/252,149 filed on Aug. 30, 2016, the entire contents of which is herein incorporated by reference.

BACKGROUND

The invention disclosed herein generally relates to security systems. More particularly, the invention disclosed herein relates to a vehicle security system for monitoring a vehicle and notifying a user based on the occurrence of an event.

Vehicle security systems in general refer to electronic systems installed on vehicles to prevent theft or tampering of a vehicle. Traditionally, vehicle security systems track or recover stolen vehicles only in certain conditions, for example, vehicles that have been subject to accidents, stripped, dismantled, etc., when police are notified as stolen by the vehicle owner, depending on the time frame of the stolen incident. Typically, the vehicle owners receive email or text messages an hour or more after the vehicle is moved. The time delay involved provides a head start for the burglar to get away with the crime. Furthermore, the delay may result in police personnel resorting to high-speed vehicle chases, which unnecessarily damage public property. A vehicle security system, which instantly notifies a user or police personnel of a probable vehicle theft, is required. Moreover, existing vehicle security systems do not provide instantaneous image feeds of an intrusion attempt. This prevents users from viewing who intrudes or steals their valuables inside the vehicle or the vehicle itself. Conventional vehicle security systems are unable to capture vehicle jackers live, directly in the process, especially when the door is opened. Alternately, children or a person related to the user may unintentionally trigger the alarm of the vehicle security system.

If video feed of the event is viewed by the owner on a monitoring electronic device, such false alarms can be avoided. A vehicle security system, which provides live image feeds of an intrusion attempt, is required. Existing vehicle security systems do not provide communication system between the vehicle owner and the suspect inside the vehicle. A vehicle system which provides instant communication system between the vehicle owner and the vehicle intruder is required. Furthermore, existing vehicle security systems do not prevent the vehicle from starting by the vehicle owner or an authorized representative. A vehicle security system, which prevents the vehicle from starting, by the vehicle owner or an authorized representative, is required. Existing vehicle security systems do not stop vehicles during a police pursuit. A vehicle security system, which stops the vehicle during a police chase by police request is required. Hence, there is a long felt but unresolved need for vehicle security system, which instantly notifies a user or police personnel of a probable vehicle theft. Furthermore, there is a need for vehicle security system, which provides live image feeds of an intrusion attempt. Moreover, there is a need for a vehicle security system, which prevents the vehicle from starting by the vehicle owner or authorized representative. Also, there is a need for a vehicle system which provides instant communication system between the vehicle owner and the vehicle intruder. Additionally, there is a need for a vehicle security system which provides a live video feeds of a suspect and a communication system between the local authority and a suspect inside a stolen moving vehicle. Furthermore, there is a need for a vehicle security system which stop a vehicle during a police chase by police request without fear of an accident.

SUMMARY

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The invention disclosed herein addresses the above-mentioned need for a vehicle security system, which instantly notifies a user or police personnel of a probable vehicle theft. Furthermore, the invention addresses a need for a vehicle security system, which provides live image feeds of an intrusion attempt. Moreover, the invention addresses a need for a vehicle security system, which prevents the vehicle from starting. The vehicle security system for monitoring a vehicle and notifying a user based on the occurrence of an event disclosed herein includes at least two image capture devices, sensors, a global positioning system tracking module, a control module, and a monitoring device. The image capture devices are positioned at predetermined locations of a vehicle for capturing and transmitting images of a target object. The sensors are configured to generate a plurality of sensor data variables based on a detection of the target object. The global positioning system tracking module generates and transmits signals based on a position of the vehicle to a monitoring device. The control module receives the captured images of the target object and the generated sensor data variables. The control module is configured to analyze the received images and the received sensor data variables based on predefined criteria to trigger auxiliary units. The control module transmits the received images and the sensor data variables based on the predefined criteria to the monitoring device. The monitoring device is configured to receive the transmitted images and the sensor data variables from the control module. A graphical user interface of the monitoring device displays the images and the sensor data variables for monitoring the vehicle and notifies the user based on the occurrence of the event.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
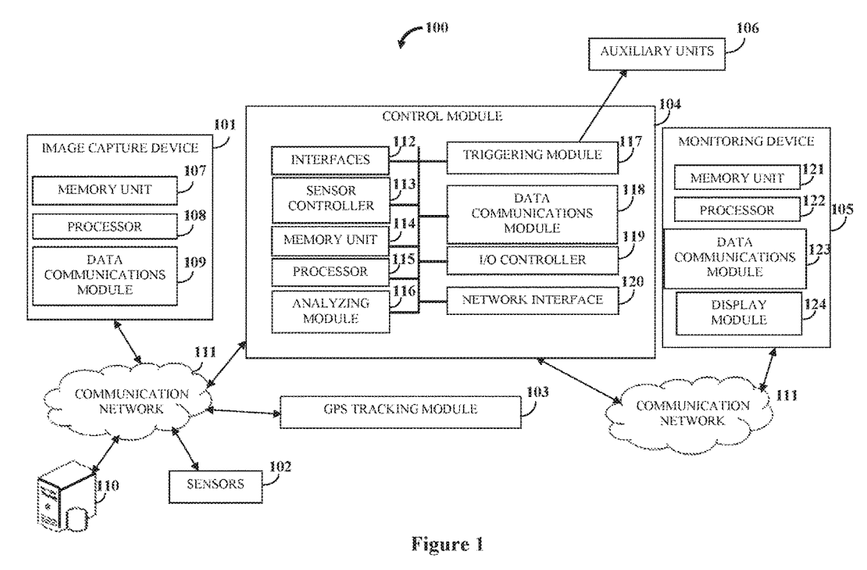
FIG. 1 exemplarily illustrates a schematic diagram of a vehicle security system.

FIG. 1 exemplarily illustrates a schematic diagram of a vehicle security system 100. The vehicle security system 100 for monitoring a vehicle and notifying a user based on the occurrence of an event disclosed herein includes at least two image capture devices 101, sensors 102, a global positioning system tracking module 103, a control module 104, and a monitoring device 105. The image capture devices 101 are positioned at predetermined locations of a vehicle for capturing and transmitting images of a target object. In an embodiment, an image capture device 101 is positioned underneath a dashboard area by the driver's side to capture images of a target object, for example, an intruder, a burglar, etc., if the target object tries to tamper with the ignition cables to start the vehicle. In an embodiment, a second image capture device 101 is positioned to capture facial features of the target object. The sensors 102 are configured to generate a plurality of sensor data variables based on a detection of the target object. The global positioning system tracking module 103 generates and transmits signals based on a position of the vehicle to a monitoring device 105. The control module 104 receives the captured images of the target object and the generated sensor data variables.

In an embodiment, a third image capture device 101 is installed on the rear of the vehicle. The image capture device 101 comprises a microphone for usual driving recording. Moreover, the image capture device 101 connects to the monitoring device 105 via a communication network 111 that implements, for example, Bluetooth® connectivity, Wi-Fi connectivity, etc. The image capture device 101 records exterior and interior images of the vehicle during driving or when a motion of the target object is detected by motion sensors 102. In an embodiment, the rear-view image capture device 101 replaces the vehicle's existing rear view mirror. A live video stream from the image capture devices 101 can be viewed from the monitoring device 105. Furthermore, the user can interact with a monitoring device 105 of a person in the vehicle, for example, parents monitoring and cautioning their children if they receive a speeding alert.

The control module 104 is configured to analyze the received images and the received sensor data variables based on predefined criteria to trigger auxiliary units 106. The control module 104 transmits the received images and the sensor data variables based on the predefined criteria to the monitoring device 105. The monitoring device 105 is configured to receive the transmitted images and the sensor data variables from the control module 104. A graphical user interface of the monitoring device 105 displays the images and the sensor data variables for monitoring the vehicle and notifies the user based on the occurrence of the event. Each of the image capture devices 101 comprises a memory unit 107, a processor 108, and a data communications module 109. The memory unit 107 is configured to store the captured one or more images of the target object. The processor 108 is communicatively coupled to the memory unit 107. The processor 108 is configured to execute the computer program instructions defined by modules of the image capture device 101. In an embodiment, the modules of the image capture device 101 comprise the data communications module 109 configured to process and transmit the captured images of the target object to one of a control module 104 and a server 110 via a communication network 111.

In an embodiment, the control module 104 comprises one or more interfaces 112, a sensor controller 113, a memory unit 114, at least one processor 115, an analyzing module 116, a triggering module 117, a data communications module 118, an I/O controller 119, and a network interface 120. The memory unit 114 is configured to store the generated sensor data variables. The processor 115 is communicatively coupled to the memory unit 114. The processor 115 is configured to execute computer program instructions defined by modules of the control module 104. The data communications module 118 is configured to receive the generated sensor data variables from the sensors 102 and the transmitted images of the target object from the image capture devices 101. The analyzing module 116 is configured to dynamically analyze the received sensor data variables and the received images of the target object to recognize a state of the vehicle based on previously stored sensor data variables retrieved from the memory unit 114. The triggering module 117 is configured to trigger the auxiliary units 106 operably coupled to the monitoring device 105 via the interfaces 112 based on the recognized state of the vehicle. The data communications module 118 is further configured to receive activation signals from the monitoring device 105.

The multiple interfaces 112 connect the sensors 102 to the control module 104 of the vehicle security system 100. The multiple interfaces 112 are, for example, one or more bus interfaces, a wireless interface, etc. The network interface 120 connects the control module 104 to the communication network 111. As used herein, "bus interface" refers to a communication system that transfers data between components inside a computing device and between computing devices. As used herein, the "monitoring device" is an electronic device, for example, a personal computer, a tablet computing device, a mobile computer, a mobile phone, a smart phone, a portable computing device, a laptop, a personal digital assistant, a smart watch, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a web browser, a portable media player, a disc player such as a Blu-ray Disc® player of the Blu-ray Disc Association, a video recorder, an audio recorder, a global positioning system (GPS) device, a theater system, any entertainment system, any other suitable computing equipment, combinations of multiple pieces of computing equipment, etc.

In an embodiment, the electronic device is a hybrid device that combines the functionality of multiple devices. Examples of a hybrid electronic device comprise a cellular telephone that includes media player functionality, a gaming device that includes a wireless communications capability, a cellular telephone that includes game and electronic mail (email) functions, and a portable device that receives email, supports mobile telephone calls, has music player functionality, and supports web browsing. In an embodiment, computing equipment is used to implement applications such as media playback applications, for example, iTunes® from Apple Inc., a web browser, a mapping application, an electronic mail (email) application, a calendar application, etc. In another embodiment, computing equipment, for example, one or more servers are associated with one or more online services.

In another embodiment, the image capture devices 101, the sensors 102, the global positioning system (GPS) tracking module 103, and the monitoring device 105 are connected to the control module 104 via a communication network 111. The communications network 111 is a network, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the sensors 102 are, for example, proximity sensors, pressure sensors, temperature sensors, etc. The sensors 102 detect temperature, pressure, proximity, etc., of the target object. The sensors 102 generate multiple sensor data variables based on the temperature, pressure, proximity, etc., of the target object. In an embodiment, the sensors 102 detect the speed of the vehicle, extreme braking, mileage statistics, check engine light of the vehicle, receive vehicle's maintenance reminders, etc., and generates sensor data variables. The memory unit 114 stores the generated sensor data variables. The processor 115 is communicatively coupled to the memory unit 114. The processor 115 is configured to execute the computer program instructions defined by the modules of the control module 104 of the vehicle security system 100. The processors 108, 115, 122 refer to any one or more microprocessors, central processor (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 115 is implemented as a processor set comprising, for example, a programmed microprocessor and a math or graphics co-processor. The processor 115 is selected, for example, from the Intel® processors such as the Itanium® microprocessor or the Pentium® processors, Advanced Micro Devices (AMD®) processors such as the Athlon® processor, Ultra-SPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The vehicle security system 100 disclosed herein is not limited to employing a processor 115. In an embodiment, the vehicle security system 100 employs a controller or a microcontroller. The processor 115 executes the modules, for example, 116, 117, 118, 119, etc., of the vehicle security system 100. The analyzing module 116 analyzes the generated sensor data variables to recognize a state of the vehicle based on existing sensor data variables stored in the memory unit 114. The triggering module 117 triggers one or more auxiliary units 106 based on the recognized state of the vehicle or an input received from a user via the I/O controller 119. The auxiliary units 106 are, for example, headlamps, indicator lamps, tail lamps of the vehicle, electric horns, air horns, braking device, ignition system, etc., of the vehicle. In an embodiment, the data communications module 118 is configured to transmit the generated sensor data variables to a server 110 via the communication network 111. This enables remote access to data regarding the state of the vehicle. In an embodiment, the triggering module 117 transmits the necessary signals to the one or more auxiliary units 111 in response to sensor data variables received from the sensing devices 102. A user may set predefined criteria for the control module 104 to trigger the one or more auxiliary units 111. In an embodiment, the graphical user interface of the monitoring device 105 provides preset options to notify the user. The notification is triggered based on crossing any one, some, or all of threshold data, for example, set minimum distance from the vehicle, etc.

In an embodiment, the monitoring device 105 comprises a memory unit 121, a processor, a data communications module 123, and a display module 124. The memory unit 121 is configured to store the generated sensor data variables. The processor 122 is communicatively coupled to the memory unit 121. In an embodiment, the processor 122 is configured to execute computer program instructions defined by modules of the monitoring device 105. In an embodiment, the modules of the monitoring device 105 comprise a data communications module 123 and a display module 124. The data communications module 123 is configured to receive the generated sensor data variables and the transmitted images of the target object from the data communication module 118 of the control module 104. The data communication module 123 receives the signals transmitted by the global positioning system (GPS) tracking module 103. The display module 124 is configured to instantaneously display the received images of the target object on the graphical user interface of the monitoring device 105. The data communication module 123 is further configured to transmit the generated sensor data variables, the received GPS tracking module 103 signals, and an alert information based on the recognized state of the vehicle to a server 110 via a communication network 111.

In an embodiment, the server 110 is monitored by security personnel, for example, police personnel, etc. When a burglar or intruder opens or tampers with the vehicle, the auxiliary units 106 are triggered by the control module 104 and notifies the monitoring device 105 of the user by streaming images of the intruder on the graphical user interface. If the intruder is known to the user, the auxiliary units 106 are turned off. Alternately, the user then instantly reports the incident to the concerned security personnel who immediately track down the vehicle. In an embodiment, one of the auxiliary units 106 is a braking device or an ignition system of the vehicle. The user or a third party additionally activates the braking device to stop the vehicle at police request to apprehend the intruder without high speed chase and fear of accident. Alternately, the ignition system is deactivated to prevent the vehicle from starting. In an embodiment, the auxiliary unit 106 is a fuel cut-off device.

The user or a third party activates the fuel cut-off device to cut the vehicle's fuel/gas and stop the vehicle at police request.

Also, the vehicle's emergency lights automatically turn on when any of the auxiliary units 106 is activated, for safety reason which alerts the police when to slow down on a vehicle pursuit. Furthermore, in a situation where there is a network failure, for example, at an underground parking lot, etc., and the intruder takes off with the vehicle, the vehicle security system 100 picks up the signal, notifies the police personnel via the server 110, tracks down and stops the vehicle by police request through the monitoring staff. Police personnel can also know if the suspect is armed or not through the video. In an embodiment, the vehicle security system 100 locks or unlocks the vehicle from the monitoring device 105 via the control module 104. In an embodiment, the vehicle automatically locks if the vehicle key in not detected by the ignition after few minutes of being unlocked via the control module 104 of the vehicle security system 100. In another embodiment, the vehicle security system 100 starts the vehicle from the monitoring device 105 via the control module. In another embodiment, the vehicle security system 100 operates the vehicle's air conditioning system from the monitoring device 105 through the control module 104.

Figure 2:
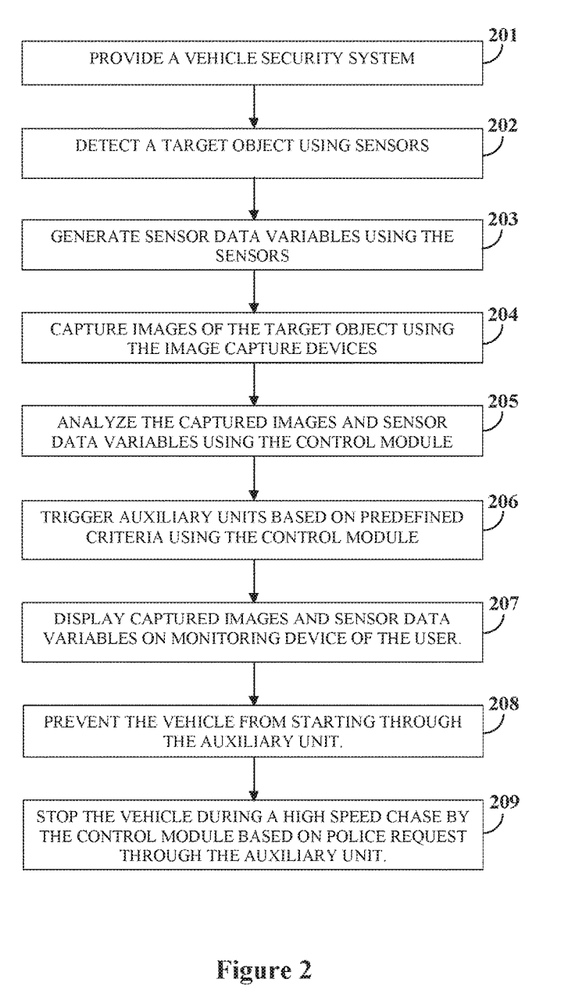
FIG. 2 exemplarily illustrates a method for monitoring a vehicle and notifying a user based on the occurrence of an event.

FIG. 2 exemplarily illustrates a method for monitoring a vehicle and notifying a user based on the occurrence of an event. In the method, disclosed herein, a vehicle security system 100 comprising at least two image capture devices 101, sensors 102, a global positioning system (GPS) tracking module 103, a control module 104, and a monitoring device 105, is provided 201. The image capture devices 101 are positioned at predetermined locations of the vehicle. A target object is detected 202 using the sensors. Sensor data variables are generated 203 using the sensors. Images of the target object are captured 204 using the image capture devices 101. The captured images and sensor data variables are analyzed 205 using the control module 104. One or more auxiliary units 106 are triggered 206 based on predefined criteria using the control module 104. The captured images and sensor data variables are displayed 207 on a graphical user interface of the monitoring device 105 of the user. The vehicle is prevented 208 from starting by the one or more auxiliary units 106. Moreover, the vehicle is stopped 209 during a high speed chase by the control module 104 based on police request through the auxiliary units 106.

The foregoing examples have been provided merely for the purpose of explanation and are in no way to be construed as limiting of the vehicle security system 100, disclosed herein. While the vehicle security system 100 has been described with reference to various embodiments, it is understood that the words, which have been used herein, are words of description and illustration, rather than words of limitation. Further, although the vehicle security system 100 has been described herein with reference to particular means, materials, and embodiments, the vehicle security system 100 is not intended to be limited to the particulars disclosed herein; rather, the vehicle security system 100 extends to all functionally equivalent structures, methods and uses, such as are within the scope of the appended claims. Those skilled in the art, having the benefit of the teachings of this specification, may affect numerous modifications thereto and changes may be made without departing from the scope and spirit of the vehicle security system 100 disclosed herein in their aspects.

Figure 3:
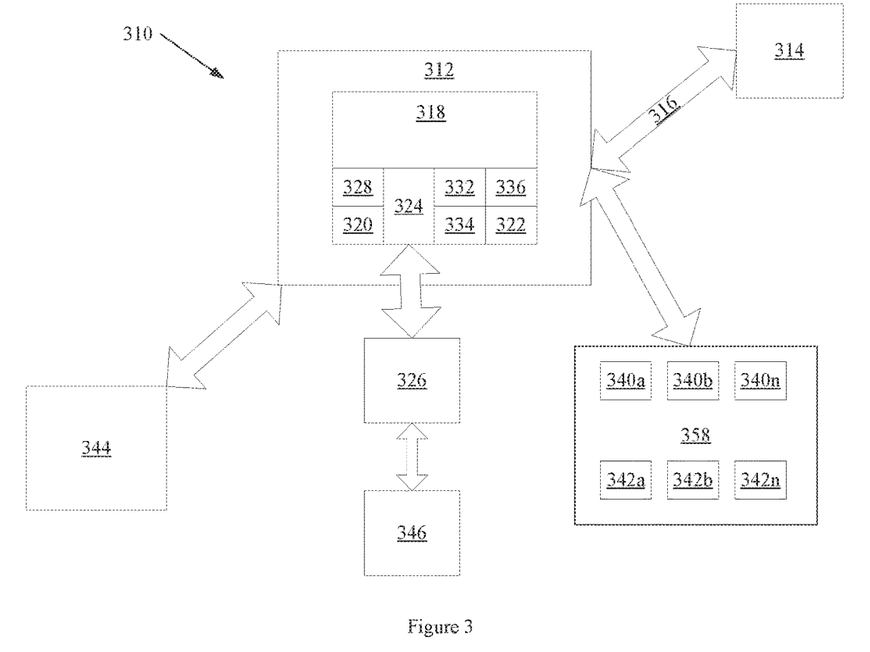
FIG. 3 exemplarily illustrates a schematic diagram of a vehicle security system.

Turning to FIG. 3, a vehicle security system 310 for monitoring a vehicle 312 and notifying a user 314 based on an occurrence of an event 316 includes a portable rear view mirror 318 having a portable rear view mirror front side 320 and a portable rear view mirror rear side 322 and a microprocessor 324 therebetween. A control module 326 is communicatively coupled to the microprocessor 324.

A first image capture device 328 is attached to the portable rear view mirror front side 320 and communicatively coupled to the microprocessor 324. A second image capture device 330 is attached to the portable rear view mirror rear side 322 and communicatively coupled to the microprocessor 324. A microphone 332 is attached to the portable rear view mirror rear side 322 and communicatively coupled to the microprocessor 324. A speaker 334 is attached to the portable rear view mirror rear side 322 and communicatively coupled to the microprocessor 324. A remote communication transmitter 336 is attached to the portable rear view mirror rear side 322 and communicatively coupled to the microprocessor 324. A video display 338 is arranged within the portable rear view mirror 318. The remote communication transmitter 336 is communicatively coupled at least one remote monitoring device 340a, 340b . . . 340n and at least one registered monitoring device 342a, 342b . . . 342n. As used in this application a remote monitoring device is defined as one member of a set of electronic devices owned and operated by the vehicle owner, such as vehicle key fob, remote control, a personal computer, a tablet computing device, a mobile computer, a mobile phone, a smart phone, a portable computing device, a laptop, a personal digital assistant, a smart watch, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a web browser, a portable media player, a disc player such as a Blu-ray Disc® player of the Blu-ray Disc Association, a video recorder, an audio recorder, a global positioning system (GPS) device, a theater system, any entertainment system, any other suitable computing equipment, combinations of multiple pieces of computing equipment, etc. As used in this application a registered monitoring device is defined as at least one member of a set of electronics devices added or registered by the vehicle owner but used or monitored by the vehicle owner family relation, vehicle owner associate, authorized vehicle user, and a central security monitoring station, such as vehicle key fob, remote control, a personal computer, a tablet computing device, a mobile computer, a mobile phone, a smart phone, a portable computing device, a laptop, a personal digital assistant, a smart watch, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a web browser, a portable media player, a disc player such as a Blu-ray Disc® player of the Blu-ray Disc Association, a video recorder, an audio recorder, a global positioning system (GPS) device, a theater system, any entertainment system, any other suitable computing equipment, combinations of multiple pieces of computing equipment, etc.

Alternately, a communication system 344 can be communicatively coupled to the microprocessor 324 and further comprising the microphone 332, the speaker 334, the at least one remote monitoring device 340a, 340b . . . 340n and the at least one registered monitoring device 342a, 342b . . .

342n. As used in this application a communication system 344 is defined as . . . a visual and auditory communication. Additionally, the control module 326 can be communicatively coupled to an auxiliary unit 346. As used in this application an auxiliary unit is defined as a system that either can stop the vehicle or prevent the vehicle from starting such as one member of the set comprising: braking system of the vehicle, an ignition system of the vehicle, a fuel cut-off system, and similar systems.

Figure 4:
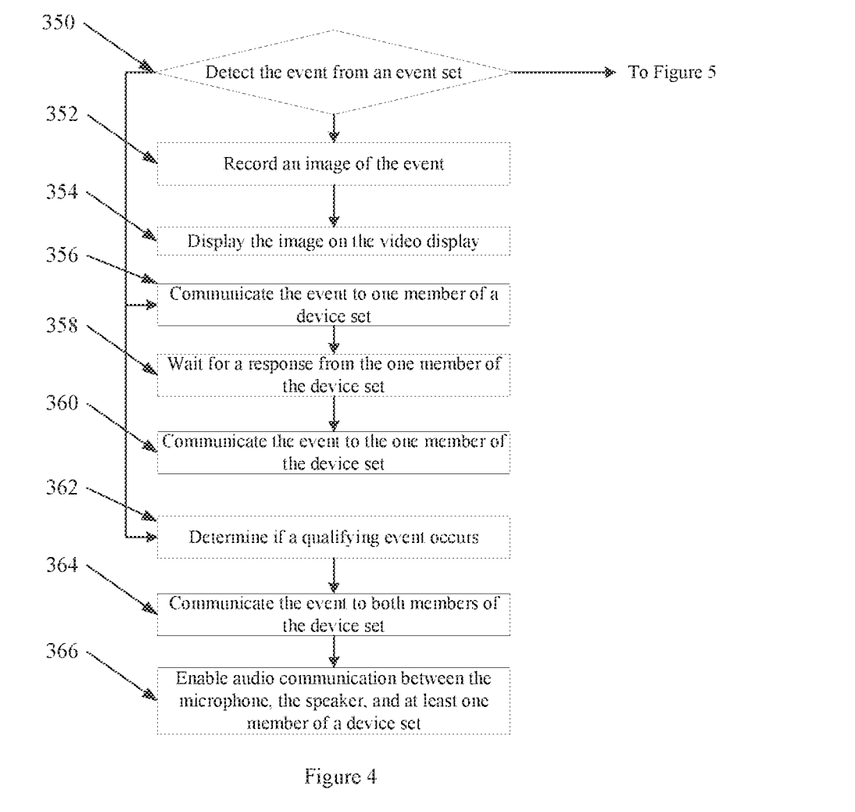
FIG. 4 exemplarily illustrates a method for monitoring a vehicle and notifying a user based on the occurrence of an event.

The microprocessor 324 is programmed to communicate to the control module 326 with instructions to, at step 350, detect the event 316 from an event set. The event set consists of a vehicle theft attempt, a burglary attempt, an intruder attempt, a vehicle jacking attempt, a driver before driving insecurity, a driver while driving insecurity, and a driver after driving insecurity. As used in this application a driver insecurity is defined as potential robbery attack of the driver close the vehicle, for example at a parking lot; potential vehicle jacking attempt, robbery attempt, rape attempt, or any threatening attempt of the vehicle driver before, during and after driving with unknown person, for example a taxi driver with unknown passenger.

The microprocessor 324 is programmed to communicate to the control module 326 with instructions to, at step 352, to record an image of the event. The microprocessor 324 is programmed to communicate to the control module 326 with instructions to, at step 354, to display the image on the video display 338.

The microprocessor 324 is programmed to communicate to the control module 326 with instructions to, at step 356, communicate the event 316 to one member of a device set 358 consisting of: the at least one remote monitoring device 340a, 340b . . . 340n and the at least one registered monitoring device 342a, 342b . . . 342n.

The microprocessor 324 is programmed to communicate to the control module 326 with instructions to, at step 357, wait for a response from the one member of the device set. Then to, at step 360, communicate the event to the one member of the device set. In some embodiments, communicating the event to the one member of the device set further comprises producing an emergency tone.

In some embodiments, the control module 326 is located on the vehicle 312 and programmed with more instructions to, at step 362, determine if a qualifying event occurs. Then, to, at step 364, communicate the qualifying event to both members of the device set. The qualifying event is one member of a qualifying event set consisting of: unlocking the vehicle, locking the vehicle, and starting the vehicle.

In some embodiments, the control module 326 is further programmed with more instructions to, at step 366, enable audio communication between the microphone, the speaker, and at least one member of a remote set consisting of: the at least one remote monitoring device, the at least one registered monitoring device, a central security monitoring station, a police station, and a local authority station.

Figure 5:
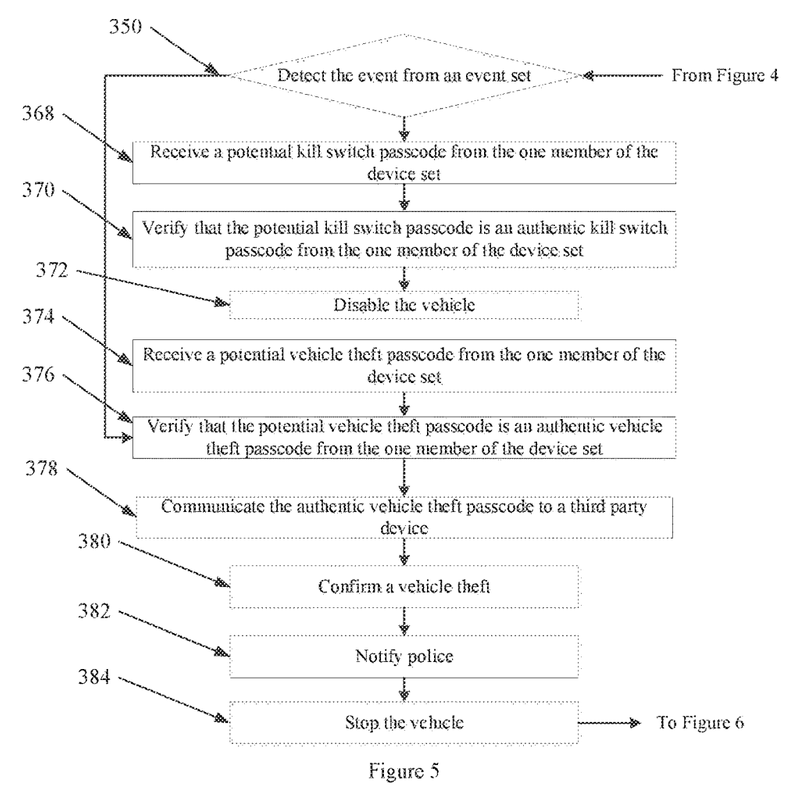
FIG. 5 exemplarily illustrates a method for monitoring a vehicle and notifying a user based on the occurrence of an event.

In some embodiments, the microprocessor 324 is further programmed to communicate to the control module 326 with more instructions to, at step 368, receive a potential kill switch passcode from the one member of the device set. Then, at step 370, to verify that the potential kill switch passcode is an authentic kill switch passcode from the one member of the device set. Finally, at step 372, to disable the vehicle. As used in this application a kill switch passcode is defined as a passcode that permits disabling, preventing or stopping a vehicle from starting by inputting an authorization secret code to execute the command. The kill switch passcode is created by the vehicle owner. The kill switch passcode is authenticated by the control module 326. The kill switch is programmed to disable or stop the vehicle from starting through a monitoring device. The kill switch is connected to the auxiliary unit on the vehicle by through the control module. When the kill switch pass code is authenticated the kill switch disables the vehicle.

In some embodiments, the microprocessor 324 is further programmed to communicate to the control module 326 with more instructions to, at step 374, receive a potential vehicle theft passcode from the one member of the device set. Then, at step 376, to verify that the potential vehicle theft passcode is an authentic vehicle theft passcode from the one member of the device set. After that, at step 378, to communicate the authentic vehicle theft passcode to a third party device. The third party device is programmed with further instructions to, at step 380, confirm a vehicle theft. A vehicle theft can be determined through the vehicle rear view mirror image capturing device, additionally, a vehicle owner, an authorized user, or a third party can communicate with the vehicle occupant using the speaker and the microphone. Then, at step 382, to notify police.

In some embodiments, the microprocessor 324 is further programmed to communicate to the auxiliary unit 346 through the control module 326 with the instructions to, at step 384, stop a moving stolen vehicle through a central security monitoring station with police supervision.

Figure 6:
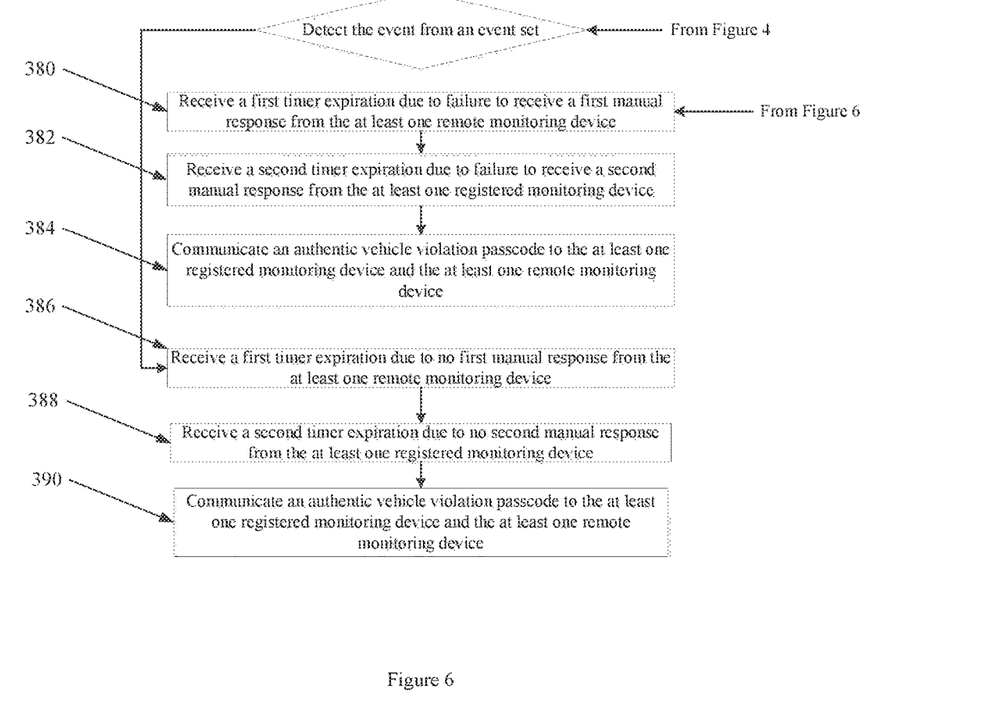
FIG. 6 exemplarily illustrates a method for monitoring a vehicle and notifying a user based on the occurrence of an event.

In some embodiments, the microprocessor 324 is further programmed to communicate to the control module 326 with added instructions to, at step 386, receive a first timer expiration due to failure to receive a first manual response from the at least one remote monitoring device. Then, at step 388, to receive a second timer expiration due to failure to receive a second manual response from the at least one registered monitoring device. After that, at step 390, to communicate an authentic vehicle violation passcode to the at least one registered monitoring device and the at least one remote monitoring device. The authentic vehicle violation passcode is one member of a passcode set consisting of: a vehicle theft passcode, a vehicle burglary passcode, and a vehicle theft attempt pass code.

In some embodiments, the microprocessor 324 is further programmed to communicate to the control module 326 with more instructions to, at step 392, receive a first timer expiration due to no first manual response from the at least one remote monitoring device. Then, at step 394, receive a second timer expiration due to no second manual response from the at least one registered monitoring device. Following that, at step 396, to communicate an authentic vehicle violation passcode to the at least one registered monitoring device and the at least one registered monitoring device.

Figure 7:
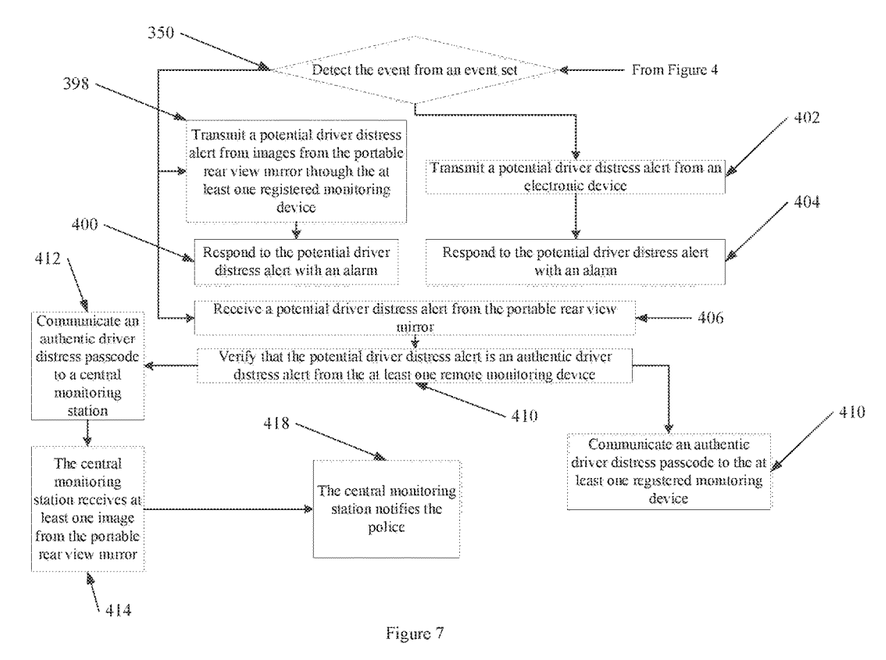
FIG. 7 exemplarily illustrates a method for monitoring a vehicle and notifying a user based on the occurrence of an event.

In some embodiments, the microprocessor 324 is further programmed to communicate to the control module 326 with more instructions to, at step 398, transmit a potential driver distress alert from an electronic device. Then, at step 400, to respond to the potential driver distress alert with an alarm.

In some embodiments, the microprocessor 324 is further programmed to communicate to the control module 326 with more instructions to, at step 402, transmit a potential driver distress alert from images from the portable rear view mirror through the at least one registered monitoring device. Then, at step 404, to respond to the potential driver distress alert with an alarm.

In some embodiments, the microprocessor 324 is further programmed to communicate to the control module 326 with more instructions to, at step 406, receive a potential driver distress alert from the portable rear view mirror. Then, at step 408, verify that the potential driver distress alert is an authentic driver distress alert from the at least one remote monitoring device.

Figure 8:
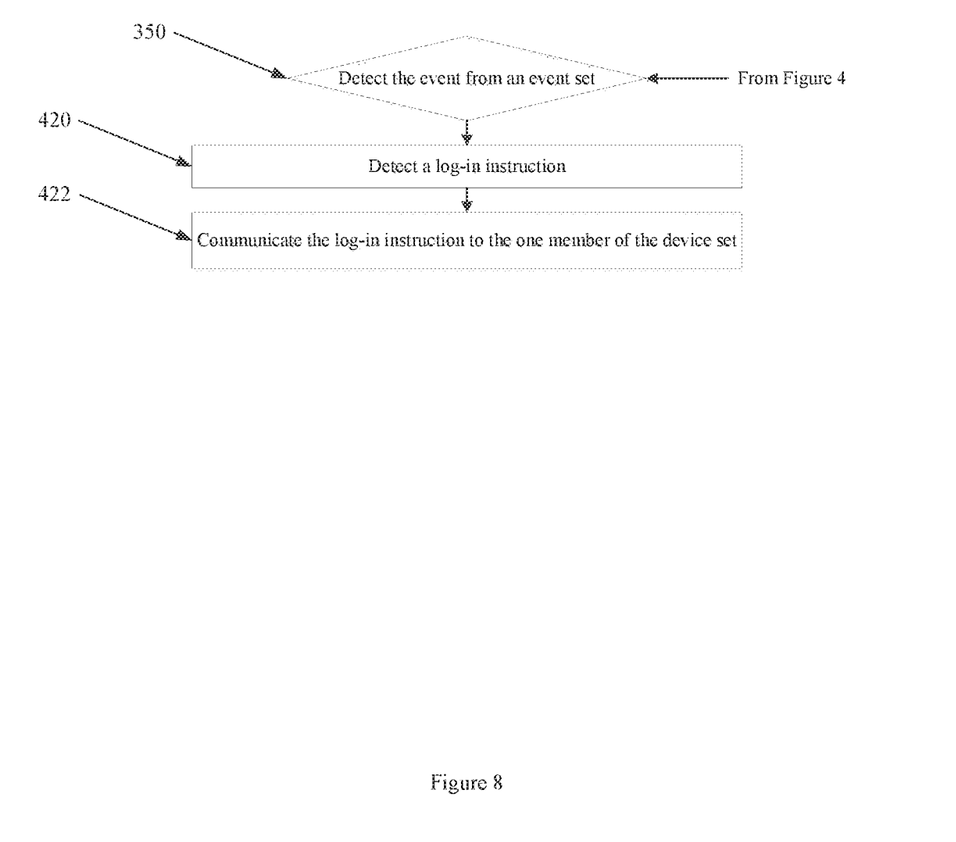
FIG. 8 exemplarily illustrates a method for monitoring a vehicle and notifying a user based on the occurrence of an event.

In some embodiments, the microprocessor 324 is further programmed to communicate to the control module 326 with more instructions to, at step 410, communicate an authentic driver distress passcode to the at least one registered monitoring device.

In some embodiments, the microprocessor 324 is further programmed to communicate to the control module 326 with more instructions to, at step 412, communicate an authentic driver distress passcode to a central monitoring station.

In some embodiments, the central monitoring station, at step 414, receives a communication of the authentic driver distress passcode from the portable rear view mirror and notifies police at step 418. Then, at step 416, the central monitoring station receives at least one image from the portable rear view mirror and notifies the police at step 418.

In some embodiments, the microprocessor 324 is further programmed to communicate to the control module 326 with more instructions to, at step 420, detect a log-in instruction. Then, at step 422, to communicate the log-in instruction to the one member of the device set.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A vehicle security system for monitoring a vehicle and notifying a user based on an occurrence of an event, the vehicle security system comprising:
    a portable rear view mirror, having a portable rear view mirror front side and a portable rear view mirror rear side and a microprocessor therebetween;
    a control module, communicatively coupled to the microprocessor a first image capture device, attached to the portable rear view mirror front side and communicatively coupled to the microprocessor;
    a second image capture device, attached to the portable rear view mirror rear side and communicatively coupled to the microprocessor;
    a microphone, attached to the portable rear view mirror rear side and communicatively coupled to the microprocessor;
    a speaker, attached to the portable rear view mirror rear side and communicatively coupled to the microprocessor;
    a remote communication transmitter, attached to the portable rear view mirror rear side and communicatively coupled to the microprocessor;
    at least one speed sensor, communicatively coupled to the microprocessor and configured to determine a detected speed of the vehicle;
    at least two remote monitoring devices communicatively coupled to the remote communication transmitter;
    at least two registered monitoring device communicatively coupled to the remote communication transmitter;
    wherein the microprocessor to communicate to the control module with instructions to:
    detect the event from an event set consisting of: a vehicle theft attempt, a burglary attempt, an intruder attempt, a vehicle jacking attempt, a driver before driving insecurity, a driver while driving insecurity, and a driver after driving insecurity;
    record an image of the event;
    communicate the event to one member of a device set consisting of: the at least one remote monitoring device and the at least one registered monitoring device;
    wait for a response from the one member of the device set;
    communicate the event to the one member of the device set;
    activating simultaneously the first and second image capture devices from the detected speed of the vehicle; and
    automatically sending a simultaneous live video alert from the first and second image capture device to a monitoring device of the user.

2. The vehicle security system of claim 1, further comprising:
    a video display, arranged within the portable rear view mirror;
    wherein the microprocessor is further programmed with additional instructions to display the image on the video display.

3. The vehicle security system of claim 1, wherein communicating the event to the one member of the device set further comprises producing an emergency tone.

4. The vehicle security system of claim 1, wherein the control module is located on the vehicle and programmed with more instructions to:
    determine if a qualifying event occurs; wherein the qualifying event is one member of a qualifying event set consisting of: unlocking the vehicle, locking the vehicle, and starting the vehicle; and
    communicating the qualifying event to both members of the device set.

5. The vehicle security system of claim 1,
a communication system, communicatively coupled to the microprocessor and further comprising the microphone, the speaker, the at least one remote monitoring device and the at least one registered monitoring device;
wherein the control module is further programmed with more instructions to enable audio communication between the microphone, the speaker, and at least one member of a remote set consisting of: the at least one remote monitoring device, the at least one registered monitoring device, a central security monitoring station, a police station, and a local authority station.

6. The vehicle security system of claim 1, wherein the microprocessor is further programmed to communicate to the control module with more instructions to:
receive a potential kill switch passcode from the one member of the device set;
verify that the potential kill switch passcode is an authentic kill switch passcode from the one member of the device set; and
disable the vehicle.

7. The vehicle security system of claim 1, wherein the microprocessor is further programmed to communicate to the control module with more instructions to:
receive a potential vehicle theft passcode from the one member of the device set;
verify that the potential vehicle theft passcode is an authentic vehicle theft passcode from the one member of the device set; and
communicate the authentic vehicle theft passcode to a third party device;
wherein the third party device is programmed with further instructions to:
confirm a vehicle theft; and
notify police.

8. The vehicle security system of claim 7, wherein the microprocessor is further programmed to communicate to an auxiliary unit through the control module with the instructions to: stop a moving stolen vehicle through a central security monitoring station with police supervision.

9. The vehicle security system of claim 7, wherein the microprocessor is further programmed to communicate to the control module with added instructions to:
receive a first timer expiration due to failure to receive a first manual response from the at least one remote monitoring device;
receive a second timer expiration due to failure to receive a second manual response from the at least one registered monitoring device;
communicate an authentic vehicle violation passcode to the at least one registered monitoring device and the at least one remote monitoring device.

10. The vehicle security system of claim 9, wherein the authentic vehicle violation passcode is one member of a passcode set consisting of: a vehicle theft passcode, a vehicle burglary passcode, and a vehicle theft attempt pass code.

11. The vehicle security system of claim 1, wherein the microprocessor is further programmed to communicate to the control module with more instructions to:
receive a first timer expiration due to no first manual response from the at least one remote monitoring device;
receive a second timer expiration due to no second manual response from the at least one registered monitoring device;
communicate an authentic vehicle violation passcode to the at least one registered monitoring device and the at least one registered monitoring device.

12. The vehicle security system of claim 11, wherein the authentic vehicle violation passcode is one member of a passcode set consisting of: a vehicle theft passcode, a vehicle burglary passcode, and a vehicle theft attempt pass code.

13. The vehicle security system of claim 1, wherein the microprocessor is further programmed to communicate to the control module with more instructions to:
transmit a potential driver distress alert from an electronic device;
responding to the potential driver distress alert with an alarm.

14. The vehicle security system of claim 1, wherein the microprocessor is further programmed to communicate to the control module with more instructions to:
transmit a potential driver distress alert from images from the portable rear view mirror through the at least one registered monitoring device;
respond to the potential driver distress alert with an alarm.

15. The vehicle security system of claim 1, wherein the microprocessor is further programmed to communicate to the control module with more instructions to:
receive a potential driver distress alert from the portable rear view mirror; and
verify that the potential driver distress alert is an authentic driver distress alert from the at least one remote monitoring device.

16. The vehicle security system of claim 15, wherein the microprocessor is further programmed to communicate to the control module with added instructions to: communicate an authentic driver distress passcode to the at least one registered monitoring device.

17. The vehicle security system of claim 15, wherein the microprocessor is further programmed to communicate to the control module with added instructions to: communicate an authentic driver distress passcode to a central monitoring station.

18. The vehicle security system of claim 17, wherein the central monitoring station receives a communication of the authentic driver distress passcode from the portable rear view mirror and notifies police.

19. The vehicle security system of claim 18, wherein the central monitoring station receives at least one image from the portable rear view mirror and notifies the police.

20. The vehicle security system of claim 1, wherein the microprocessor is further programmed to communicate to the control module with more instructions to: detect a log-in instruction; and communicate the log-in instruction to the one member of the device set.

21. A process for monitoring a vehicle; the process comprises:
detecting an event from an event set consisting of: a vehicle theft attempt, a burglary attempt, an intruder attempt, a vehicle jacking attempt, a driver before driving insecurity, a driver while driving insecurity, and a driver after driving insecurity;
recording an image of the event;
displaying the image on a video display
communicating the event to a device set comprising: at least two remote monitoring devices and at least two registered monitoring devices;

waiting for a response from the device set;
communicating the event to the device set; wherein communicating the event to the one member of the device set further comprises producing an emergency tone;
determining if a qualifying event occurs; wherein the qualifying event is one member of a qualifying event set consisting of: unlocking the vehicle, locking the vehicle, and starting the vehicle;
communicating the qualifying event to the device set;
forming a communication system, communicatively coupled to a microprocessor and further comprising a microphone, a speaker, and the device set;
enabling audio communication between the microphone, the speaker, the at least one remote monitoring device and the at least one registered monitoring device
activating simultaneously the first and second image capture devices from the detected speed of the vehicle; and
automatically sending a simultaneous live video alert from the first and second image capture device to a monitoring device of the user.

22. The process of claim 21, further comprising:
receiving a potential kill switch passcode from the device set;
verifying that the potential kill switch passcode is an authentic kill switch passcode from the one member of the device set; and
disabling the vehicle.

23. The process of claim 21, further comprising:
receiving a potential vehicle theft passcode from the device set;
verifying that the potential vehicle theft passcode is an authentic vehicle theft passcode from the one member of the device set; and
communicating the authentic vehicle theft passcode to a third party device; wherein the third party device is programmed with instructions to: confirm a vehicle theft; and notify police.

24. The process of claim 23, further comprising: communicating to an auxiliary unit through a control module with the instructions to: stop a moving stolen vehicle through a central security monitoring station with police supervision.

25. The process of claim 23, further comprising:
receiving a first timer expiration due to no first manual response from the at least two remote monitoring devices;
receiving a second timer expiration due to no second manual response from the at least two remote monitoring devices;
communicating an authentic vehicle violation passcode to the device set.

26. The process of claim 23, further comprising:
transmitting a potential driver distress alert from an electronic device;
responding to the potential driver distress alert with an alarm.

27. The process of claim 23, further comprising:
receiving a potential driver distress alert from a portable rear view mirror in the vehicle; and
verifying that the potential driver distress alert is an authentic driver distress alert from the at least one remote monitoring device.

28. The process of claim 23, further comprising: communicating an authentic driver distress passcode to the at least two registered monitoring devices.

29. The process of claim 23, further comprising: communicating an authentic driver distress passcode to a central monitoring station.

30. The process of claim 29, further comprising: receiving, at the central monitoring station, a communication of authentic driver distress from a portable rear view mirror in the vehicle and notifying the police.

31. The process of claim 30, further comprising: detecting a log-in instruction; and communicate the log-in instruction to the one member of the device set.

32. The process of claim 21, wherein a vehicle user is one member of a vehicle user set consisting of: a vehicle owner, a vehicle owner's associate or an authorized vehicle user.

33. The process of claim 21, wherein a device set user is one member of a device user set consisting of: a vehicle owner, a vehicle owner's associate, a vehicle owner's relation, and an authorized vehicle user.

34. The process of claim 21, wherein a third party is one of a third party set security monitoring personnel, a police and a local authority.

* * * * *